(12) United States Patent
Rose

(10) Patent No.: US 7,208,925 B2
(45) Date of Patent: Apr. 24, 2007

(54) VOLTAGE REGULATOR CONTROLLER POWER GOOD INDICATOR CIRCUITRY

(75) Inventor: Bruce W. Rose, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 341 days.

(21) Appl. No.: 10/932,659

(22) Filed: Sep. 1, 2004

(65) Prior Publication Data

US 2006/0043946 A1    Mar. 2, 2006

(51) Int. Cl.
*G05F 1/56* (2006.01)
(52) U.S. Cl. .................. 323/280; 323/225; 323/285
(58) Field of Classification Search .............. 323/225, 323/266, 274, 275, 280, 284, 285
See application file for complete search history.

(56) References Cited

U.S. PATENT DOCUMENTS

| 6,654,264 | B2 | 11/2003 | Rose |
| 6,661,263 | B2 | 12/2003 | Rose et al. |
| 6,691,239 | B1 | 2/2004 | Rose |
| 6,798,178 | B1 * | 9/2004 | Bayadroun ............. 323/274 |
| 6,850,044 | B2 * | 2/2005 | Hansen et al. ............ 323/266 |

* cited by examiner

*Primary Examiner*—Jessica Han
(74) *Attorney, Agent, or Firm*—Cyndi M. Wheeler

(57) ABSTRACT

A method, circuit, and system for providing a power good signal for a voltage regulator are described. The voltages of the two input pins to an error amplifier within a voltage regulator may be compared to determine if the error amplifier is operating in the linear range. If it is determined the error amp is operating in the linear range, then the voltage regulator is operating properly, and the power good signal may be set to a high level.

15 Claims, 3 Drawing Sheets

VOLTAGE REGULATOR CONTROLLER POWER GOOD INDICATOR CIRCUITRY

BACKGROUND

The present invention relates to the field of power distribution for electronic systems, and more specifically to the generation of a power good signal for a voltage regulator.

Electronic systems require monitoring circuits and signals to ensure that the voltage rails are operating within an appropriate range. Typically, the voltage rails will have a constant direct current (DC) value, with associated alternating current (AC) noise. For this type of supply rail, a voltage reference and comparator circuit may be used to generate a "power good" signal by monitoring the output voltage to determine if it is within the desired range.

For some implementations/loads, it is advantageous to create supply rails having complex output voltages. These supply rails have output voltages that are dependent upon the load current and/or the operating state of the load. Some exemplary implementations of complex output voltages include implementing a load line and/or ACPI power states, and Intel® Speed Step™ technology.

Conventional methods to generate a "power good" signal do not produce accurate results for a voltage regulator (VR) that generates complex output voltages. For a complex output voltage VR, the allowed output voltage range must be so large as to allow voltages outside of the allowed accuracy specifications to be indicated as good signals.

BRIEF DESCRIPTION OF THE DRAWINGS

A better understanding of the present invention can be obtained from the following detailed description in conjunction with the following drawings, in which.

DETAILED DESCRIPTION

Embodiments of a method, circuit, and system for voltage regulator power good circuitry are disclosed.

In the following description, numerous specific details are set forth in order to provide a more thorough understanding of the present invention. It will be appreciated, however, that the invention may be practiced without such specific details. In other instances, control structures, gate level circuits and full software instruction sequences have not been shown in detail in order not to obscure the invention.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Furthermore, the particular features, structures, or characteristics may be combined in any suitable manner in one or more embodiments.

Figure 1:
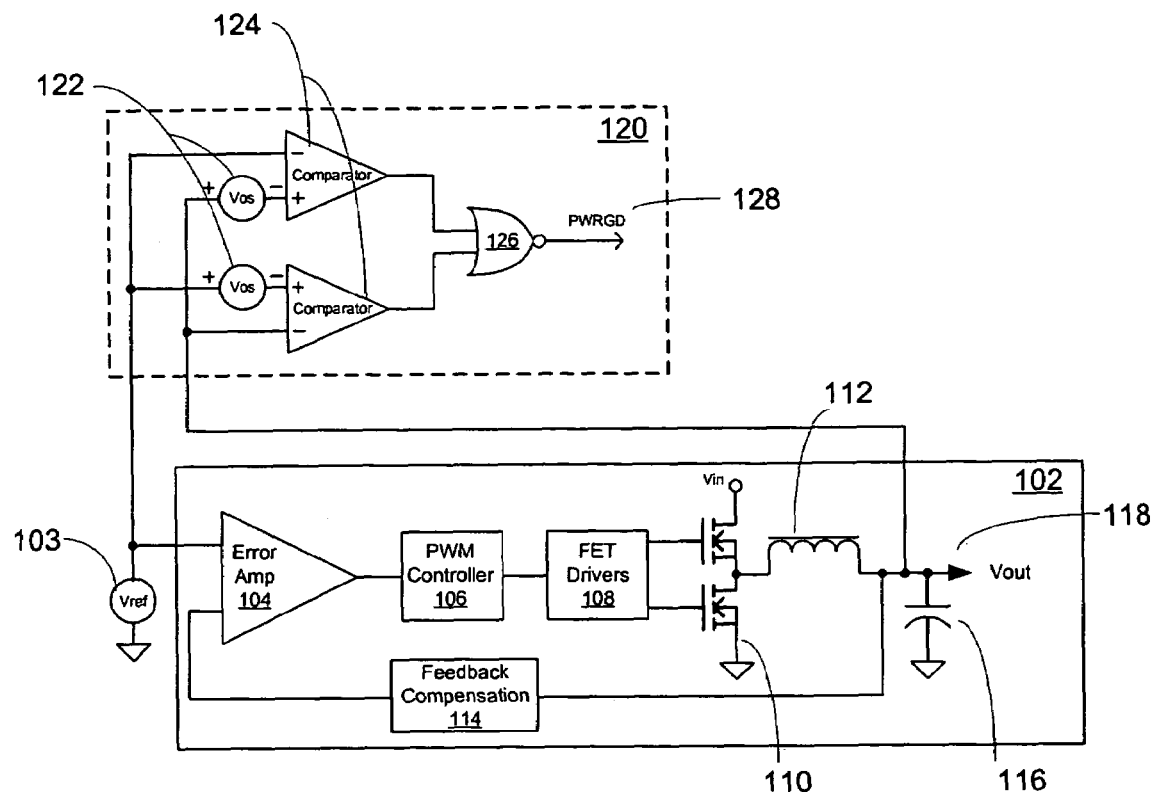
FIG. 1 is an illustration of a power good detection circuit of the prior art

FIG. 1 illustrates a voltage regulator and power good signal generation circuit of the prior art. A reference voltage, Vref (103), is input into the voltage regulator circuitry, and an output voltage, Vout (118), is generated by the voltage regulator.

A typical voltage regulator (102) includes an error amplifier (104), a pulse width modulator (PWM) controller (106), field effect transistor (FET) drivers (108), field effect transistors (FETs) (110), an inductor (112), a capacitor (116), and a feedback compensation circuit (114).

Figure 2:
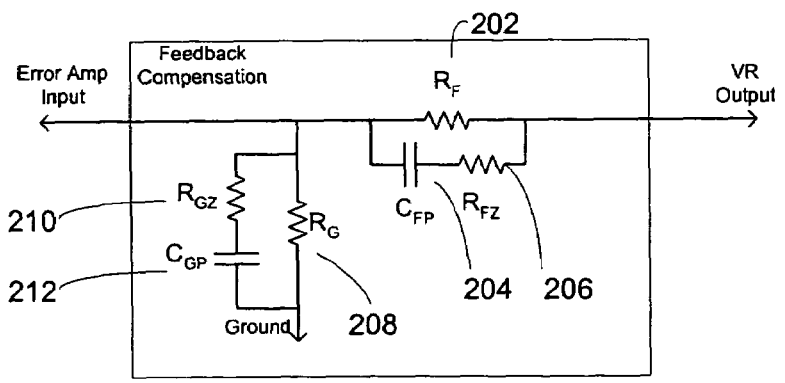
FIG. 2 is an illustration of one embodiment of a feedback compensation circuit

An exemplary feedback compensation circuit, illustrated in detail in FIG. 2, may include a resistor, Rf (202), between the output of the voltage regulator and the error amplifier input and a second resistor, Rg (208), between the error amplifier and ground. In addition, a series capacitor (204) and resistor (206) may be placed in parallel with resistor Rf (202) and another series resistor (210) and capacitor (212) may be placed in parallel with resistor Rg (208). The values of Rf and Rg are used to set the output voltage of the voltage regulator. The additional series capacitors and resistors in parallel with Rf and Rg are used to control the transient response of the voltage regulator. The values of all resistors and capacitors in the feedback compensation circuit may vary depending on the desired output voltage and transient response of the voltage regulator.

Returning to FIG. 1, power good circuitry (120) is used to generate a power good signal, PWRGD, (128) that indicates whether the voltage regulator is operating properly. In present voltage regulator implementations, the output voltage, Vout (118), is compared with a reference voltage, Vref (103), to determine when the voltage regulator is producing the correct output voltage. Using comparators (124), the reference voltage, Vref (103), is compared to the sum of the output voltage of the voltage regulator, Vout (118), plus an offset voltage, Vos (122). The output voltage of the voltage regulator, Vout (118) is also compared to the sum of the reference voltage, Vref (103) plus an offset voltage, Vos (122). The offset voltage, Vos (122), is used to set a range of acceptable output voltages, or a tolerance, for the voltage regulator. For example, Vos may be set to 5% of the desired output voltage. For a complex voltage generating voltage regulator, Vos may be set to a much larger voltage.

The outputs of the comparators (124) are combined using a NOR gate (126). The NOR gate output provides a power good signal (128) to the system to indicate when the voltage regulator is properly regulating the power rail.

When using the prior art method of generating a power good signal in conjunction with a voltage regulator that generates complex voltages, the error or tolerance allowed (Vos) between the reference voltage and the output voltage needs to be quite large because of the dynamic nature of the output voltage. This may lead to an output voltage that is out of regulation with no change in the power good signal, and thus no output voltage fault will be generated.

Figure 3:
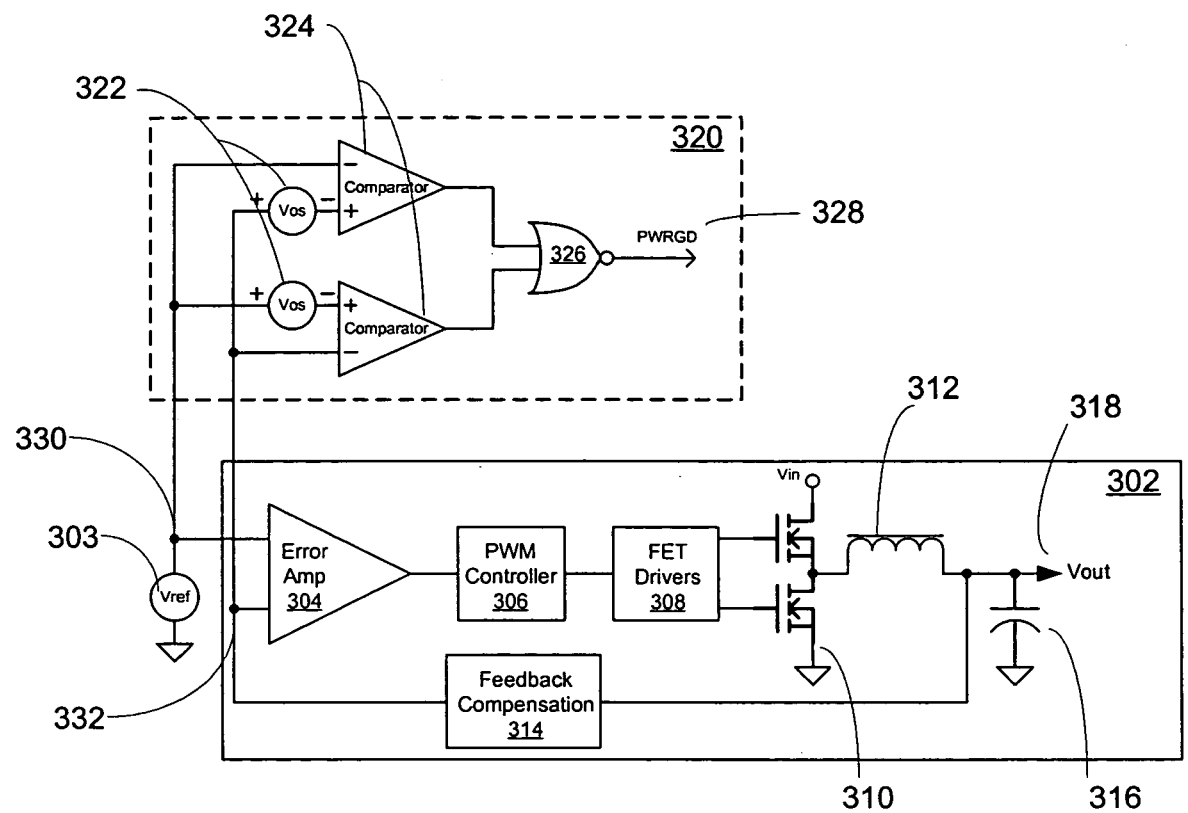
FIG. 3 is an illustration of a power good detection circuit according to one embodiment of the present invention.

FIG. 3 illustrates a voltage regulator (302) and power good circuitry (320) according to one embodiment of the present invention. The voltage regulator (302) may include an Error Amp (304), a pulse width modulator (PWM) controller (306), field effect transistor (FET) drivers (308), field effect transistors (FETs) (310), an inductor (312), a capacitor (316), and a feedback compensation circuit (314). The feedback compensation circuit may be similar to that illustrated and described above in conjunction with FIG. 2, and may include a resistor, Rf, between the output of the voltage regulator and the error amplifier input and a second resistor, Rg, between the error amplifier and ground. In addition, a series capacitor and resistor may be placed in parallel with resistors Rf and Rg. The values of Rf and Rg are used to set the output voltage of the voltage regulator. The additional series capacitor and resistor in parallel with Rf and Rg are used to control the transient response of the voltage regulator.

In one embodiment, the voltage regulator (302) may be a complex voltage generating voltage regulator. In a complex voltage generating voltage regulator, the output voltage, Vout (318), is set to a value that is dependent upon the load conditions. The output voltage may be dependent upon the load current, the operating mode of a processor in a system, other circuit parameters, or a combination of factors such as those previously mentioned. Thus, a single complex voltage generating voltage regulator may be able to regulate a wide range of different voltages.

Power good circuitry (320) is used to generate a power good signal (328) that indicates whether the voltage regulator is operating properly. By connecting the power good circuitry to the voltage regulator in a different manner than illustrated in FIG. 1, the power good circuitry may be used effectively to indicate whether a complex voltage generating voltage regulator is operating properly.

In one embodiment, the two inputs to the error amplifier (304) are compared to one another to determine when the voltage regulator is operating properly. The reference voltage, Vref (303), the first input to error amplifier (304), is compared to the output of the feedback compensation circuit (314), the second input to the error amp (304), to determine when the voltage regulator is operating properly. By comparing the two inputs of the error amplifier rather than comparing the input of the regulator to the output, the power good circuit of FIG. 3 has the ability to dynamically and accurately detect power good for any voltage generated by the voltage regulator.

Using comparators (324), the first error amp input (330) is compared to the sum of the second error amp input (332) plus an offset voltage, Vos (322). The second error amp input (332) is compared to the sum of the first error amp input (330) plus an offset voltage, Vos (322). As described above, the offset voltage, Vos (322) is used to set a range of acceptable voltages for the voltage regulator. When the inputs of an error amplifier in a complex voltage generating voltage regulator are compared to one another, as illustrated in FIG. 2, Vos may be a much smaller offset as compared to that in the circuit of FIG. 1. This allows the power good signal to more accurately indicate when the voltage regulator is properly regulating the output voltage.

As described above in conjunction with FIG. 1, the outputs of the comparators (324) are coupled to a logical operator. In one embodiment, a NOR gate (326) may be used to combine the outputs of the comparators. The NOR gate output provides a power good signal (328) to the system to indicate when the voltage regulator is properly regulating the power rail.

When each of the two inputs of the error amplifier are connected to the power good circuitry in the manner illustrated in FIG. 3, the power good circuitry detects when the error amplifier (304) in the voltage regulator (302) is operating in the linear range. If the voltages at the two input terminals of the error amp are approximately equal to one another within a predetermined offset tolerance (Vos), it is an indication that the error amp is operating in the linear range and that the voltage regulator is properly regulating the power rail. In this case, the power good signal (328) would remain high. If the voltages at the two input terminals of the error amp are not approximately equal to one another within a predetermined offset tolerance (Vos), it is an indication that the error amp is operating outside of the linear range and that the voltage regulator is not properly regulating the power rail. The power good signal will go low when the inputs to the power good circuitry are not approximately equal to one another. When the power good signal goes low, this indicates that the voltage regulator is not working properly, and components in the system may be disabled.

The power good circuitry and voltage regulator configuration illustrated in FIG. 3 may be used with any voltage regulator topology which incorporates an error amplifier or other sense amplifier. Embodiments of the present invention may be implemented with several different voltage regulator topologies, including the switching regulator topology (302) illustrated in FIG. 3, and the linear regulator topology illustrated in FIG. 4.

Figure 4:
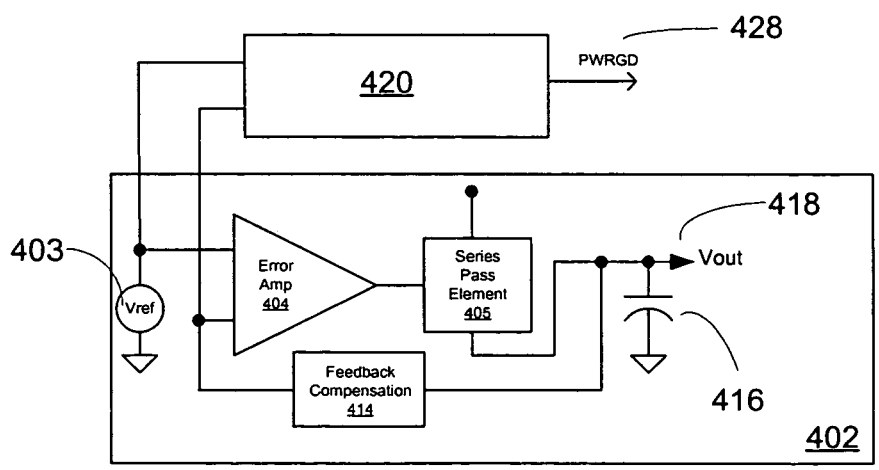
FIG. 4 is an illustration of a power good detection circuit according to another embodiment.

FIG. 4 illustrates power good circuitry connected to a linear voltage regulator according to one embodiment of the present invention. The linear voltage regulator (402) may include an error amplifier (404), series pass element (405), and feedback compensation (414).

By connecting each input of the error amplifier (404) to the power good circuitry in the same manner described above in conjunction with FIG. 3, the power good circuitry may detect when the error amplifier (404) is operating in the linear range. Power good circuitry (420) generates a power good signal (428) to indicate whether the error amplifier (404) is operating in the linear range, and thus whether the voltage regulator (402) is operating properly.

Figure 5:
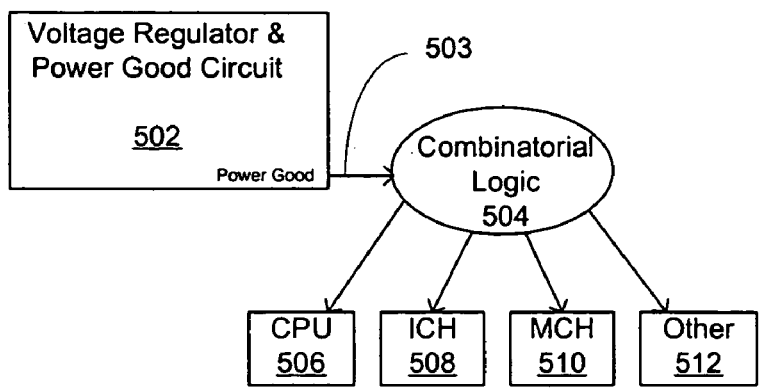
FIG. 5 is a conceptual illustration of a system according to one embodiment of the present invention.

FIG. 5 illustrates one embodiment of a system that uses the voltage regulator and power good circuitry of FIG. 3. The voltage regulator control circuit (502) outputs a power good signal (503). The power good signal is input into combinatorial logic (504). Combinatorial logic (504) is used to determine whether portions of the system should be enabled or disabled depending on the value of the power good signal (503), and may control power to the components in the system. If the power good signal is at a high level, the components in the system will be enabled and operational. If the power good signal goes to a low level, which indicates that the error amplifier is not operating in the linear range and that the voltage regulator is not operating properly, one or more components in the system may be disabled. The system may include components such as a processor or CPU (506), I/O controller hub (ICH) (508), memory controller hub (MCH) (510) and/or other components (512).

Figure 6:
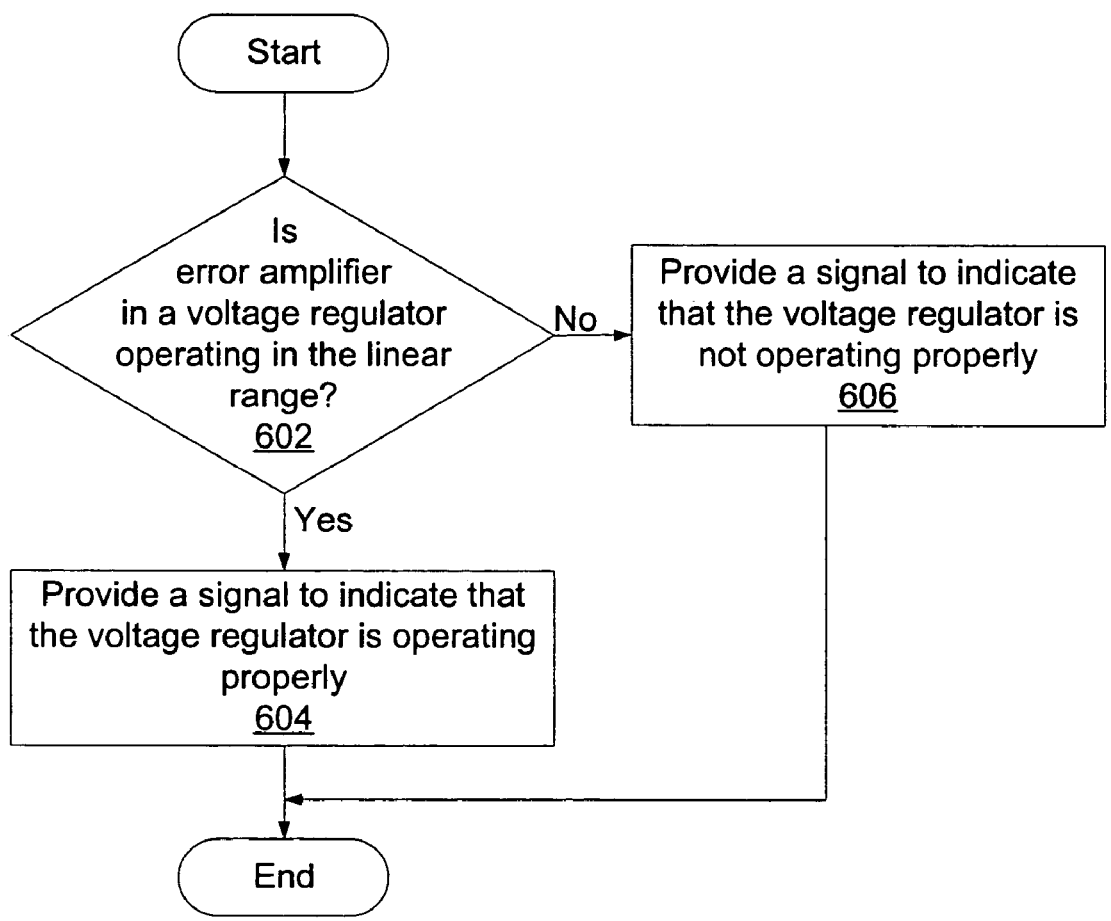
FIG. 6 is a flow chart illustrating one embodiment of the present invention.

FIG. 6 is a flowchart that illustrates one embodiment of the present invention. First, as shown in block 602, a determination is made whether an error amplifier in a voltage regulator is operating in the linear range. The voltage regulator may be one that is capable of generating complex voltages. In one embodiment, the determination of whether the error amplifier is operating in the linear range may be made by comparing the voltage of each of the input pins of the error amplifier to one another. If the voltages are approximately equal to one another, within a predetermined tolerance, the error amplifier is operating in the linear range. If the voltages are not approximately equal to one another and are outside of the tolerance range, then the error amplifier is not operating in the linear range.

If it is determined that the error amplifier is operating in the linear range, then a signal is provided to indicate that the voltage regulator is operating properly, as shown by block 604. The signal may be a power good signal that is set to a high level to indicate that the voltage regulator is operating properly.

If it is determined that the error amplifier is not operating in the linear range, then a signal is provided to indicate that the voltage regulator is not operating properly, as shown by block 606. The signal may be a power good signal that is set to a low level to indicate that the voltage regulator is not operating properly.

Thus, a method, circuit, and system to generate a power good signal for a complex voltage generating voltage regulator are disclosed. In the above description, numerous specific details are set forth. However, it is understood that embodiments may be practiced without these specific details. In other instances, well-known circuits, structures and techniques have not been shown in detail in order not to obscure the understanding of this description. Embodiments have been described with reference to specific exemplary embodiments thereof. It will, however, be evident to persons having the benefit of this disclosure that various modifications and changes may be made to these embodiments without departing from the broader spirit and scope of the embodiments described herein. The specification and drawings are, accordingly, to be regarded in an illustrative rather than a restrictive sense.

I claim:

1. A method comprising:
   determining if an error amplifier within a voltage regulator is operating in a linear range by comparing the voltage of a first input of the error amplifier to the sum of the voltage of a second input of the error amplifier plus a voltage offset to provide a first comparator output, and comparing the voltage of the second input of the error amplifier to the sum of the voltage of the first input of the error amplifier plus a voltage offset to provide a second comparator output; and
   providing a signal to indicate that the voltage regulator is operating properly when the error amplifier is operating in the linear range.

2. The method of claim 1, wherein the voltage regulator generates complex voltages.

3. The method of claim 1, further comprising performing a logical operation on the first comparator output and the second comparator output.

4. The method of claim 1, wherein the signal is a power good signal.

5. A circuit comprising:
   voltage regulator logic to regulate a voltage, wherein the voltage regulator logic comprises an error amplifier; and
   power good logic to indicate when the error amplifier is operating in the linear range, the power good logic including a first comparator to compare the voltage of a first input of an error amplifier to the sum of the voltage of a second input of the error amplifier plus an offset voltage to provide a first comparator output and a second comparator to compare the voltage of the second input of the error amplifier to the sum of the voltage of the first input of the error amplifier plus the offset voltage to provide a second comparator output.

6. The circuit of claim 5, wherein the power good logic further comprises a logical operator coupled to the first comparator output and the second comparator output to provide a power good signal.

7. The circuit of claim 6, wherein the logical operator is a NOR gate.

8. The circuit of claim 6, wherein the power good signal indicates if the error amplifier is operating in the linear range, and indicates that the voltage regulator is properly regulating a voltage.

9. The circuit of claim 5, wherein the voltage regulator logic further comprises pulse width modulation controller logic, FET drivers, FETs, an inductor, and feedback compensation logic.

10. A system comprising:
    a device;
    a voltage regulator coupled to the device, wherein the voltage regulator comprises an error amplifier; and
    power good logic coupled to the voltage regulator and to the device, the power good logic to determine when the error amplifier is operating in the linear range and to indicate to the device that the voltage regulator is operating properly when the error amplifier in the voltage regulator is operating in the linear range, wherein the power good logic comprises a first comparator to compare the voltage of a first input of the error amplifier to the sum of the voltage of a second input of the error amplifier plus an offset voltage to provide a first comparator output, a second comparator to compare the voltage of the second input of the error amplifier to the sum of the voltage of the first input of the error amplifier plus the offset voltage to provide a second comparator output; and a logical operator coupled to the first comparator output and the second comparator output to provide a power good signal.

11. The system of claim 10, wherein the voltage regulator further comprises pulse width modulation controller logic, FET drivers, FETs, an inductor, and feedback compensation logic.

12. The system of claim 10, wherein the device comprises one of: a processor, a memory controller hub, or an I/O controller hub.

13. A circuit comprising:
    an error amplifier having a first input, a second input, and an output;
    a first comparator to compare the voltage of the first input of the error amplifier to the sum of the voltage of the second input of the error amplifier plus an offset voltage to provide a first comparator output;
    a second comparator to compare the voltage of the second input of the error amplifier to the sum of the voltage of the first input of the error amplifier plus the offset voltage to provide a second comparator output; and
    a logical operator coupled to the first comparator output and the second comparator output to provide a power good signal.

14. The circuit of claim 13, wherein the error amplifier is part of a voltage regulator.

15. The circuit of claim 14, wherein the power good signal indicates when the voltage regulator is operating properly.

* * * * *